United States Patent [19]

Rogers

[11] Patent Number: 4,815,347
[45] Date of Patent: Mar. 28, 1989

[54] LATHE ATTACHMENT WITH AXIALLY MOVABLE CHUCK

[75] Inventor: Thomas L. Rogers, Los Altos, Calif.

[73] Assignee: Jaxial, Inc., Los Altos, Calif.

[21] Appl. No.: 114,432

[22] Filed: Oct. 29, 1987

[51] Int. Cl.⁴ .............................................. B23B 3/36
[52] U.S. Cl. .................................... 82/153; 279/1 A; 408/135
[58] Field of Search ............... 82/34 R, 31, 1 A, 1 B; 279/1 A, 1 M, 61, 1 TE; 408/135, 136

[56] References Cited

U.S. PATENT DOCUMENTS

| | | | |
|---|---|---|---|
| 3,258,997 | 7/1966 | Krisovitch | 82/34 R |
| 4,301,699 | 11/1981 | Butler | 82/34 R |
| 4,484,608 | 11/1984 | Ferdinand | 408/135 |

Primary Examiner—Frederick R. Schmidt
Assistant Examiner—Blynn Shideler
Attorney, Agent, or Firm—Thomas E. Schatzel

[57] ABSTRACT

A housing is shaped to mate with a large turret or engine type lathe tailstock. A rack and pinion assembly is mounted within the housing with a chuck attached to an end of the rack. An adjustable hand lever is attached to the pinion and allows the operator to advance the rack and chuck with precision control. The attachment virtually eliminates drill bit breakage.

14 Claims, 1 Drawing Sheet

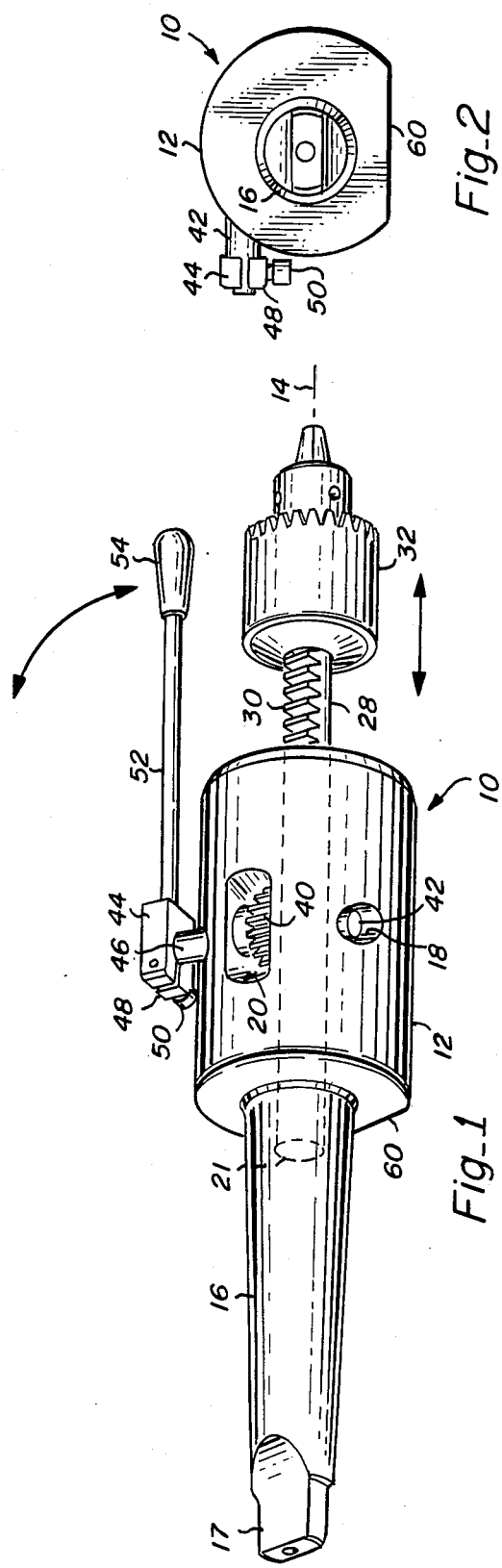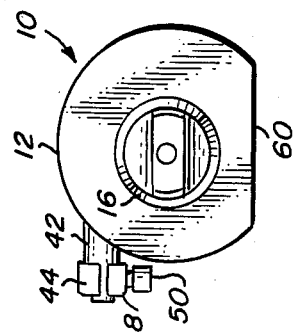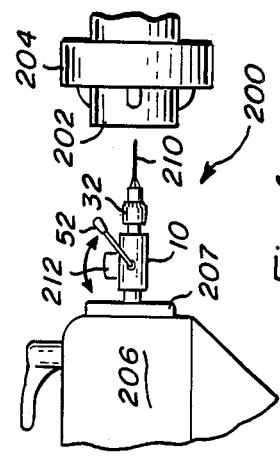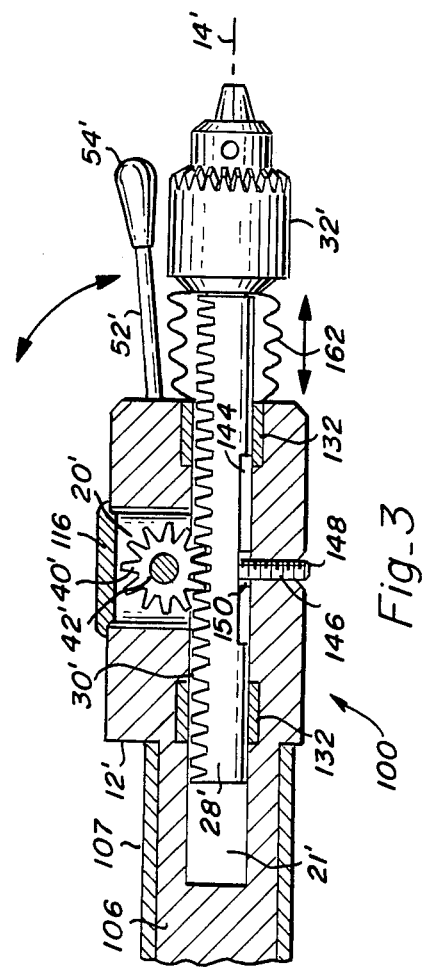

LATHE ATTACHMENT WITH AXIALLY MOVABLE CHUCK

BACKGROUND OF THE INVENTION

1. Field of the Invention

This invention relates generally to lathe attachments and more specifically to such attachments having an axially movable chuck.

2. Description of the Prior Art

Machine tools, such as lathes, and their fixtures are well known in the art. Some examples are shown in U.S. Pat. No. 879,741 by H.L. Coit; U.S. Pat. No. 933,179 by A.I. Jacobs; U.S. Pat. No. 1,150,142 by A.P. Morrow; U.S. Pat. No. 1,195,214 by O.D. Hapgood; U.S. Pat. No. 3,691,883 by M.S. Ingram; U.S. Pat. No. 4,021,051 by Y. Toyomoto, et al; U.S. Pat. No. 4,379,667 by H. Yoshimoto, et al; U.S. Pat. No. 4,496,163 by K.G. Bernfeld; and U.S. Pat. No. 4,548,532 by K. Watanabe, et al.

In a lathe, the piece to be worked upon is held in a chuck which rotates. A tool, such as a drill, is held in a chuck or a tailstock turret of a tailstock. The tailstock is moved axially toward the rotating work to engage the tool to the piece. This axial movement of the tailstock and tool is typically accomplished by using a hand crank and screw assembly. There are some difficulties with this method. The heavy tailstock and frictional forces in the hand crank assembly can make movement of the hand crank awkward for the lathe operator. A skilled lathe operator must be able to feel how much force the tool is exerting on the work piece. This is especially critical in precision drilling situations which involve using drill bits of very small size. If the lathe operator advances the drill too fast, the drill will not have time to clear the drill shavings away and the drill will break. However, the heavy tailstock and hand crank assembly interfere with the lathe operator's ability to feel how much force the small drill is exerting on the workpiece.

One prior art attempt to solve these problems uses a slidable lathe attachment. The attachment is mounted in the chuck of a tailstock. The attachment has a rod which slides axially foward from a housing. A chuck is attached to the end of the rod for holding a drill bit. The operator is able to slide the drill forward without moving the tailstock. Yet, this attachment is difficult to use because the exact position of the drill bit is hard to control. The drill bit can be easily broken if too much force is applied. In addition, because the attachment is itself mounted in a chuck, there can be misalignment problems.

SUMMARY OF THE PRESENT INVENTION

It is therefoe an object of the present invention to provide a lathe attachment for fine precision work.

It is another object of the present invention to provide a lathe attachment with a controllable axially movable chuck which mounts directly into a lathe tailstock.

Briefly, in a preferred embodiment, the present invention comprises a housing which is shaped to mate directly with a lathe tailstock. A rack and pinion assembly is mouned within the housing with a chuck attached to an end of the rack. An adjustable hand lever is attached to the pinion and allows the operator to advance the rack and chuck with precision control.

An advantage of the present invention in that it provides a lathe attachment for fine precision work.

Another advantage of the present invention in that it provides a lathe attachment with a controllable axially movable chuck which mounts directly into a lathe tailstock.

These and other objects and advantages of the present invention will no doubt become obvious to those of ordinary skill in the art after having read the following detailed description of the preferred embodiments which are illustrated in the various drawing figures.

IN THE DRAWINGS

FIG. 1 is a perspective view of a lathe attachment of the present invention;

FIG. 2 is an end view of the attachment of Fig. 1;

FIG. 3 is a cross-sectional side elevation view of an alternative embodiment of the present invention; and FIG. 4 is a side elevation view of the present invention mounted in a lathe.

DETAILED DESCRIPTION OF THE PREFERRED EMBODIMENT

FIG. 1 shows a perspective view of a lathe attachment of the present invention and is designated by the general reference number 10. A steel housing 12 is generally cylindrical in shape and has a longitudinal axis 14. A steel lathe attachment section or shank 16 is integrally connected to housing 12. Shank 16 has a tang 17. Shank 16 is symmetrical about axis 14. Shank 16 is tapered and shaped to fit within a tailstock of a large engine or turret type lathe. Attachment 10 is thus mounted directly in the tailstock and can be accurately aligned.

Housing 12 has a pinion axle passage 18, whose axis is perpendicular to the axis 14. Housing 12 also has a pinion chamber 20 which intersects the axle passage 18. A rack passage 21, is located in housing 12 along axis 14 and is shaped to receive a steel rack 28. Rack 28 is generally cylindrical in shape, but has a flat tooth section 30 along its top surface. A steel chuck 32 is attached to the end of rack 30. Chuck 32 may be a Cushman or Albrecht type chuck.

A steel pinion 40 is located inside pinion chamber 20. Pinion 40 is attached to a steel pinion axle 42 which is positioned inside pinion axle passage 18. Pinion 40 mates with tooth section 30 of rack 28.

An adjustable lever support 44 has an aperture 46 which receives one end of pinion axle 42. Support 44 has a slot 48 connected to aperture 46. An adjustment screw 50 passes through support 44 and across slot 48. By adjusting screw 50, a vice-like grip is achieved on axle 18. A lever 52 is attached to and extends from support 44 in a direction perpendicular to axle 18. A plastic finger grip 54 is attached to the end of lever 52.

FIG. 2 shows an end view of attachment 10 of Fig. 1. Note that the housing 12 has a flat section 60. Section 60 provides the operator with a reference surface so that the attachment 10 can be quickly and properly aligned in the tailstock. Attachment 10 is inserted into a tailstock with section 60 on top. A small magnetic box can then be placed on section 60 to hold small drill bits and other tools. Section 60 also prevents the attachment 10 from rolling around when not in use.

FIG. 3 shows a cross-sectional side elevation view of an alternative embodiment of the lathe attachment of the present invention and is designated by the general reference number 100. Various elements of the attachment 100 are similar to those of attachment 10 and carry the same reference numeral distinguished by a prime designation. The housing 12' is cylindrically shaped and has the longitudinal axis 14'. Housing 12' is made of aluminum.

An aluminum lathe attachment section or shank 106 is integrally connected to housing 12' and is symmetrical about axis 14'. A steel sleeve 107 fits over shank 106. Sleeve 107 is cylindrical and shaped to fit in a tailstock turret and/or bed turret. In contrast, the shank 16 of attachment 10 is shaped to fit directly into the tailstock without the need of a chuck.

A pinion chamber 20' is located inside housing 12'. A pinion axle passage intersects the wall forming pinion chamber 20' in a direction perpendicular to axis 14'. A pinion axle 42' is mounted in the pinion axle passage and is attached to a pinion 40'. A plastic safety cover 116 fits over the top opening of chamber 20'. A lever 52' with a finger grip 54' is attached to axle 42' in a manner similar to that shown in FIG. 1.

A rack passage 21' is located along axis 14' inside housing 12' and shank 106. A pair of cylindrical bearings 132 are attached to housing 12' inside passage 21' with one bearing 132 located on each end of housing 12' and are on opposite sides of chamber 20'. A steel cylindrical rack 28' is sized to fit inside passage 21' and bearings 132. Rack 28' has a flat tooth section 30' on its top surface. The surface of teeth 30' mate with pinion 40' inside pinion chamber 20'.

Rack 28' has a longitudinal slot channel 144 along its bottom side. A stop screw aperture 146 passes through the wall of housing 12' perpendicular to axis 14' and intersects with slot channel 144. A nylon locking dog point set screw 148 is inserted through aperture 146 and extend into slot channel 144. The stop screw 148 limits the longitudinal travel extremes of rack 28' and controls the torque between the rack 28' and pinion 40'.

A steel chuck 32' is attached to the end of rack 28'. A flexible accordian safety sleeve 162 fits around rack 28' and is attached to housing 12' and chuck 32'.

It should be noted that attachments 10 and 100 are similar except for the different shanks, the safety cover 116 and the sleeve 162. The interior or attachment 10 is exactly the same as that shown for attachment 100.

FIG. 4 shows a side elevation view of a portion of a lathe and is designated by the general reference number 200. A workpiece 202 is mounted in a chuck 204. A tailstock 206 and a tailstock spindle 207 receive attachment 10 at its shank 16. A tool, e.g. a drill bit 210 is inserted into chuck 32 of attachment 10. Tailstock 206 is then moved into a position near workpiece 202 and is locked into place. A magnetic box 212 may be placed on section 60 of attachment 10. Box 212 contains small drill bits.

The lathe rotates chuck 204 and workpiece 202. The lathe operator can slowly and precisely advance the drill bit 210 to the spinning workpiece 202 by moving control lever 52. Precision drilling as small as 0.005 inch diameter holes is easily accomplished without breaking the fine drill bits. The relatively light weight of attachment 10 and the direct rack and pinion connection allow the operator to feel the degree of force exerted on workpiece 202. This is a vast improvement over moving the entire heavy tailstock 206 forward by hand crank screw assembly. In addition, the rack and pinion assembly of attachment 10 allows the operator to move the drill bit 210 forward or backward with precise control as fast or as slow as is desired in direct response to the operator's hand control. In contrast, the prior art method of moving the heavy tailstock by a hand crank severely limited the speed and control at which the operator could move the drill bit. The attachment 10 is relatively inexpensive and can be adapted to existing lathes. Thus, the present invention provides a way to improve the operation of existing lathes with a minimum of cost.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. A lathe attachment comprising:
   a housing having a longitudinal axis, an attachment means for mating with said lathe, a rack passage parallel to said longitudinal axis, a pinion axle passage perpendicular to said longitudinal axis, a pinion passage intersecting said rack passage and said pinion axle passage, and a stop member;
   a rack slidably mounted within said rack passage along said longitudinal axis and having a slot channel aligned to receive said stop member, said slot channel being shaped with end walls to interact with said stop member to limit the longitudinal travel of the rack;
   a pinion axle mounted within said pinion axle passage;
   a pinion attached to the pinion axle and located within said pinion passage, the teeth of the pinion mating with the teeth of the rack;
   a lever attached to extend from the pinion axle; and
   a chuck fixedly attached to an end of the rack such that the chuck is prevented from rotating relative to the rack.

2. The lathe attachment of claim 1 wherein, the lever is attached to the pinion axle by an adjustable connection, said connection allowing the lever to be secured to the pinion axle at any desired angle relative to said longitudinal axis.

3. The lathe attachment of claim 1 wherein, said attachment means is a tapered shank having a tang and shaped to mate with a tail stock of a lathe.

4. The lathe attachment of claim 1 wherein, said housing is generally cylindrically shaped about said longitudinal axis and has a flat reference surface parallel to said longitudinal axis for orienting said housing relative to a lathe.

5. The lathe attachment of claim 1 further including, a stop screw aperture located in the housing, perpendicular to and intersecting said slot channel; and wherein said slot channel has a longitudinal wall; and said stop member includes a stop screw assembly located inside said stop screw aperture and extending into said slot channel to limit the longitudinal travel of the rack, said stop member being adjustable along an axis normal to the longitudinal axis and to the interface with said longitudinal wall of said slot channel to control the amount of force required to move the rack, and to prevent rotational movement of the rack.

6. The lathe attachment of claim 5 wherein, the stop screw assembly comprises a nylon locking dog point set screw.

7. The lathe attachment of claim 1 further including, a first and second bearing located inside said rack passage and attached to the housing for receiving and completely encircling the rack, said first and second bearing located on either side of said pinion passage such that axial displacement of the rack is prevented.

8. The lathe attachment of claim 7 wherein, the rack is cylindrical in shape.

9. A lathe attachment comprising:
a housing having an attachment means for mating with a lathe and a stop member;
a rack slidably mounted within the housing along a longitudinal axis and having a longitudinal slot channel aligned to receive said stop member, said slot channel being shaped with end walls to interact with said stop member to limit the longitudinal travel of the rack;
a pinion rotatably mounted in the housing about an axis of rotation normal to said longitudinal axis with the teeth of the pinion mating with the teeth of the rack;
a tool holder means for securely holding a tool about an axis parallel with said longitudinal axis, and fixedly attached to an end of the rack such that the tool holder is prevented from rotating; and
a lever connected to the pinion for allowing an operator to control the amount of rotational movement about said axis of rotation and the movement of the pinion and thereby precisely control the amount of linear movement of the tool holder means.

10. The lathe attachment of claim 9 wherein, said attachment means is a tapered shank having a tang and shaped to mate with a tail stock of a lathe.

11. The lathe attachment of claim 9 wherein, said slot channel has a longitudinal wall; and
said stop member is adjustable along an axis normal to the longitudinal axis and to interface with said longitudinal wall of the slot channel, to control the amount of force required to move the rack and to prevent rotational movement of the rack.

12. The lathe attachment of claim 11, wherein, the stop member comprises a nylon locking dog point set screw.

13. The lathe attachment of claim 9 further including,
a plurality of bearings locating within the housing coaxial with said longitudinal axis and receiving and completely encircling the rack.

14. The lathe attachment of claim 13 wherein, the rack is cylindrical in shape.

* * * * *